United States Patent [19]

Cataldo

[11] 4,300,129

[45] Nov. 10, 1981

[54] SILENT WEARABLE SIGNALLING DEVICE WITH TACTILE MEANS TO PREVENT FALSE TRIGGERING

[76] Inventor: Thomas R. Cataldo, 5169 Princess Ann Rd., La Canada, Calif. 91001

[21] Appl. No.: 940,125

[22] Filed: Sep. 6, 1978

[51] Int. Cl.[3] .......................... G08B 1/08; H04Q 7/00

[52] U.S. Cl. .................................... 340/539; 340/573; 340/574; 116/DIG. 17; 200/61.58 R; 200/DIG. 2; 455/100

[58] Field of Search ............... 340/539, 531, 573, 574; 325/111, 118, 102, 16; 116/DIG. 17; 200/61.71-61.78, 61.58, DIG. 2; 24/230 R, 230 BC; 455/26, 89, 90, 95, 100

[56] References Cited

U.S. PATENT DOCUMENTS

| | | | |
|---|---|---|---|
| 2,681,955 | 6/1954 | Davis | 340/573 |
| 2,766,358 | 10/1956 | Davidson | 340/539 |
| 3,103,660 | 9/1963 | Ticktin | 340/384 R |
| 3,582,935 | 6/1971 | Verhaeghe | 340/573 |
| 3,588,858 | 6/1971 | Demuth | 340/539 |
| 3,608,541 | 9/1971 | Hall | 128/2 |
| 4,121,160 | 10/1978 | Cataldo | 340/539 |
| 4,157,540 | 6/1979 | Oros | 340/539 |

*Primary Examiner*—John W. Caldwell, Sr.
*Assistant Examiner*—Donnie L. Crosland
*Attorney, Agent, or Firm*—Frank L. Zugelter

[57] ABSTRACT

A concealable signaling, e.g., radio alarm, device worn on the person and actuated by concealed switch means that include mechanical detents. The engagement of the detents provides secret tactile information back to the wearer. The presently preferred embodiment is a miniature radio alarm transmitter concealed in a device which also serves as a belt buckle. The wearer distends his waist to actuate the transmitter. Tension in the belt moves an element through one or more detent engagements before it activates the transmitter. These detent engagements make transient changes in the belt tension which are felt by the wearer; these inform the wearer of impending activation, so preventing false transmitter signals or alarms.

14 Claims, 6 Drawing Figures

SILENT WEARABLE SIGNALLING DEVICE WITH TACTILE MEANS TO PREVENT FALSE TRIGGERING

BACKGROUND

This invention relates to miniature radio or other alarm or signaling devices to be worn on the person and actuated in a concealed manner. Such devices are used for example to summon guards or police during apparent criminal action. The invention relates further to such devices which include a tactile or other concealed means to indicate to the wearer the status of their operation, e.g., unactivated, about to be activated, or activated. It relates more particularly to a belt with a novel buckle-like device which contains a miniature transmitter, an activating switch, and a tactile silent feedback means to the wearer or operator.

The closest prior art of which I am aware is indicated below.

Davis, U.S. Pat. No. 2,681,955 and Verhasghe No. 3,582,935 show switches actuated by tightening a waist belt, but without a radio, ultrasonic, or other transmitter or any tactile feedback device.

Davidson U.S. Pat. No. 2,766,358 and Demuth No. 3,588,858 show transmitters worn on the person for alarm purposes, but actuated by means other than belt distending and without any tactile feedback means.

Ticktin U.S. Pat. No. 3,103,660 shows a battery-powered "vibrator" worn on the wrist for tactile signaling to the wearer. It may also be worn on the ankle. It is shown as a time-operated reminder device or the like and includes no alarm transmitter or other switched device controlled by the wearer.

Hall U.S. Pat. No. 3,608,541 shows a tactile or audible "buzzer" turned on by a switch in a harness, disposed to tell the wearer to straighten up when his spine is curved. No transmitter or the like is shown.

My copending application Ser. No. 780,011, filed Mar. 22, 1977, now U.S. Pat. No. 4,121,160, shows a miniature radio alarm transmitter worn on the person and actuated by squeezing it with the fingers.

The above prior art is the result of a preliminary search.

BRIEF SUMMARY

A switching device to be carried or worn on the person and operated by concealed, misleading, or inconspicuous body motion (such as stomach distension, muscle flexing, or crouching or straightening the body) is provided with novel tactile "feedback" means to inform the operator or wearer that he has actuated it. Preferably the switching device controls a miniature radio, ultrasound, or other transmitter concealed on the person, or an alarm device through conductive connections. The tactile feedback, which is not detectable by others, is accomplished by providing detent elements in the operating mechanism of the switch. The engagement and disengagement of the detent follower with the detent notches or depressions is felt by the operator. The detents may take the form of spring-loaded balls or plungers adapted to engage notches or depressions along a detent track, in known manner; such mechanisms are used in selector switches. Preferably the present switching device has a return spring strong enough to override at least some of the detent points. Certain of these points or notches may provide for deeper engagement than the others, so that the return spring will not override them and the movable element will stay in that position.

The tactile "feedback" may be felt directly at the operating element, e.g., at a push-button or the like; or it may be transmitted mechanically to some part of the operator's body, as through a band or a belt.

A series of detent positions may be provided so that a single motion can engage and disengage more than one. Switch contact means may be arranged to close momentarily to transmit a signal pulse as each detent position is passed through. The operator can then effect a predetermined number of contact closures in one motion by moving the movable element through the desired number of detent positions, sensing each detent point by touch. Receiving equipment may include a pulse-counting decoder connected so as to actuate various alarm or other devices according to the number of pulses received. The pulses may obviously be transmitted in rapid succession; the decoder may be made in known manner to recognize a given number of pulses only if they all occur within a predetermined time interval. In this mode of operation the device may be taken slowly through a desired number of detent engagements, counted by touch, and then released. The return spring will then effect a fast string of contact closures on the way back.

The mechanism may also be arranged so that contact closures occur only when the movable element is moving in one particular direction.

The detent elements may also be used to inform the operator that a signal is about to be transmitted, i.e., will be transmitted when a later detent is engaged, to reduce the probability of false signals.

A preferred form of the invention comprises a switching device of the above kind and a miniature radio alarm transmitter, all housed in a device resembling a belt buckle. When the wearer distends his waist, the belt tension displaces a movable element through two or more detent engagements. The last engagement activates the transmitter. The earlier engagements create small transient changes in belt tension which are readily felt by the wearer, and inform him silently that he is approaching the actuation of the alarm. The detent engagements may all be made to be overridden by a return spring; or the last engagement may be made deeper so that the alarm transmitter remains on after the wearer has relaxed the tension in the belt. The total travel of the movable element, i.e. the total distension, may be about 1 cm, and the spring rate of the return spring about 0.5 to 2 kg. cm.

DETAILED DESCRIPTION

Figure 1:
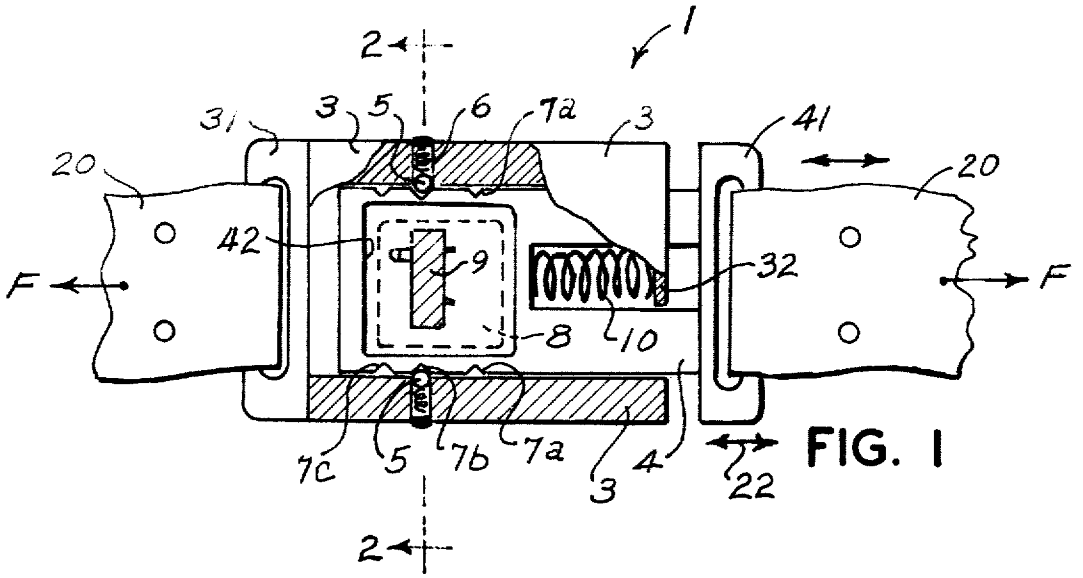
FIG. 1 is a cutaway front view of a preferred embodiment.

FIG. 1 shows the invention in the form of a belt buckle device 1, which has a main body or housing 3 and a sliding element 4 that telescopes into it. An extended side portion 31 of body 3 and having a slot therein is attachable to one end portion of a waist belt 20. A similar extended portion 41 of sliding element 4 is attachable by means of a similar slot to the other end portion of belt 20. When the wearer distends his waist, applying tension to belt 20, it tends to pull sliding element 4 part way out of the body 3, as indicated by arrow 22.

A return spring 10, FIG. 1, urges the sliding element 4 into body 3, so that normally it is all the way in with only the extension portion 41 visible. In FIG. 1 it is shown part-way pulled out by tensile forces F-F in belt 20.

This buckle-like device contains a miniature radio transmitter 8 which is turned on by a suitable switch 9 when the sliding element 4 is pulled out as far as it will go.

A main point of novelty is the set of detent notches *7a–7c* on sliding element 4, which engage detent followers as element 4 is pulled outward. The detent followers may be plungers or metal balls 5 urged inward by suitable springs 6, FIGS. 1, 2, and 6. Two sets of detents are shown in FIG. 1 to balance out sliding friction between elements 4 and 3; but obviously one set may be used, and they may be of any suitable known design.

When the wearer's waist is not distended and the sliding element 4 is all the way in, the detent followers 5 engage notches *7a*. When it is pulled clear of notches *7a*, the sudden small change in belt tension is readily felt by the wearer. Pulling the element 4 out further will engage detents 5 into the next notches *7b*, which provides another tactile signal to the wearer. When element 4 is pulled out to the last notches *7c*, a wall portion 42 of element 4 engages the plunger of switch 9 and activates the transmitter indicated at 8. Switch 9 may be a small switch of the known snap-action type, or any suitable switch.

It will be seen that the preliminary detent engagements and disengagements at *7a* and *7b* provide a concealed silent tactile warning to the wearer that the alarm transmitter is about to be activated. The final detent engagement at *7c* informs him that the transmitter is on. The detent devices provide reliable silent tactile signal information to the wearer without the use of powered vibrators or the like.

Figure 2:
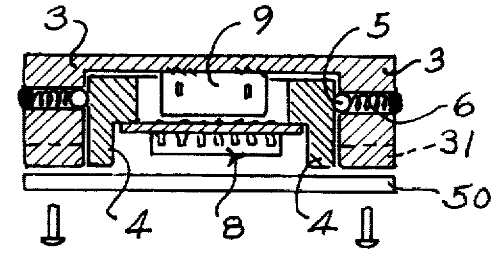
FIG. 2 is a section on line 2—2 of FIG. 1.

The section of FIG. 2 shows further the relation of parts 3 and 4. Switch 9 is attached to body 3. A removable bottom cover 50, preferably of transparent material, is fitted. Transmitter 8 is built into sliding element 4. It may be of any suitable type such as may be built on a small circuit board as shown. Alternatively the transmitter may be an ultrasonic sound generator of a suitable type; or it may be omitted where feasible and wire connections provided from switch 9 to a suitable alarm apparatus external to the wearer.

Figure 3:
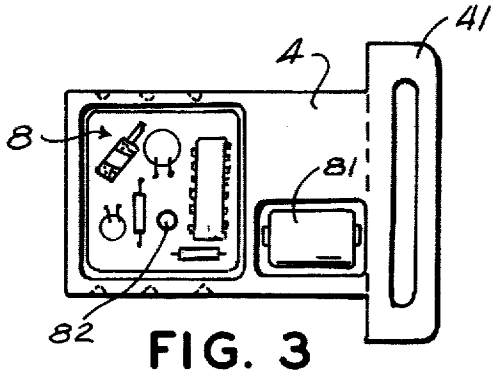
FIG. 3 is a back view of part of FIG. 1.

The bottom view of FIG. 3 shows transmitter 8 and a suitable small battery 81 to power it. Radio transmitter 8 may include a small light-emitting diode or other indicator 82 to check when it is turned on; this indicator is preferably visible through the back of the device 50.

Figure 4:
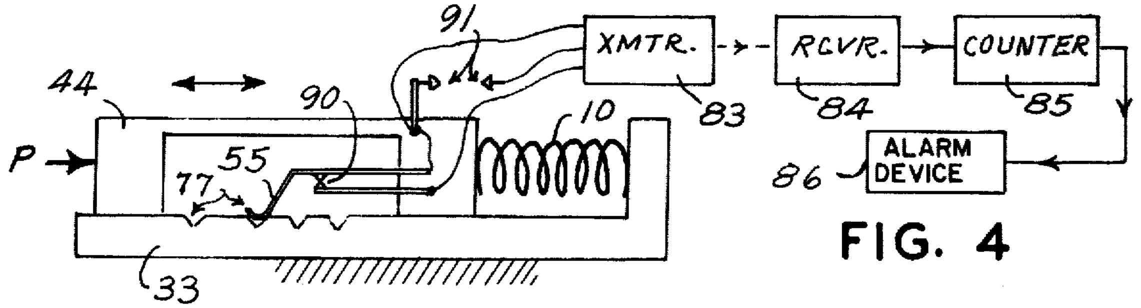
FIGS. 4 and 5 are schematic diagrams illustrating the principles of the invention.

FIG. 4 illustrates the principle of the invention more broadly in diagrammatic form. A detent follower 55 of any convenient design may engage successively any convenient number of detent notches 77 in a base member 33 as a movable element 44 is moved along, as in response to a force P exerted by the wearer or operator against a return spring 10. Contacts 90 may be provided which close momentarily as each notch or depression 77 is engaged and passed over. Another pair of contacts 91 may also be provided which close at some desired point, e.g. at the end of travel of movable element 44. The contacts 90 and 91 are connected to any suitable signaling device such as a radio transmitter 83. The operator may transmit coded information in a concealed manner by moving element 44 through various displacements, noting by the tactile "feel" from the detent engagements through element 44 the number of engagements that have occurred. A suitable receiver 84 having signal output terminals may feed a counter 85 which in turn controls a suitable actuating or alarm device 86 in accordance with the predetermined numbers, or series of numbers, of pulses received from the counter 85 due to closures of contacts 90 or 91.

Figure 5:
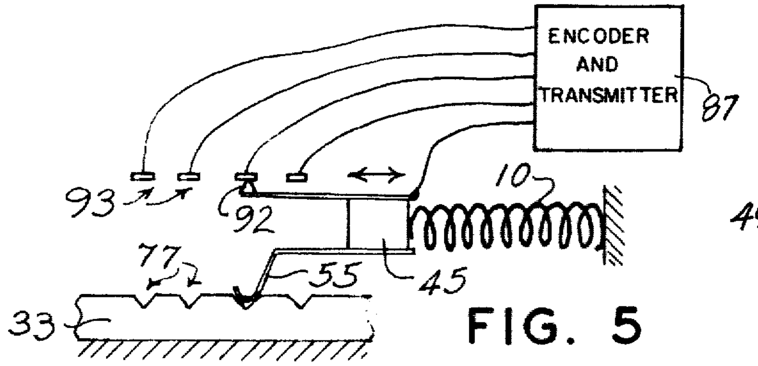

The modification of FIG. 5 shows schematically a similar detent mechanism which, however, has a separate row of individual stationary contacts 93 successively engageable by movable contact 92. Contacts 93 are correspondingly positioned to the notches 77 and are connected to suitable circuitry 87 which encodes and transmits information as a function of which and how many of contacts 93 have been selected by the operator's displacement of movable element 45 to which follower 55 is operably connected. The tactile "feedback" to the operator works as before. Circuitry 87 may be chosen or designed according to the usual engineering practices.

Figure 6:
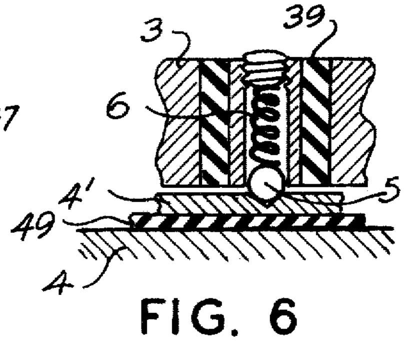
FIG. 6 is a sectional view of a modified detent.

FIG. 6 is an enlarged sectional view of a modified spring-and-ball detent device like that of FIGS. 1 and 2 but with noise attenuation or suppression added. In certain constructions, detent engagements may tend to produce an audible transmissible click. Such click-like sounds are typically of the form of short trains of oscillations in the mid-audio frequency range, generally above a few hundred Hz, and are generated by the damped oscillation of small structures excited by mechanical pulses or step-functions of short rise-time. The radiation of such transmitted clicks may be suppressed or eliminated by mechanical low-pass filtering between the pulse source and the surrounding structure. FIG. 6 shows suitable filtering in the form of a sleeve of rubber-like material 39 surrounding the detent follower assembly 5, 6, and a pad of similar material 49 between a separate notch strip 4' and the underlying structure of the movable element 4. Soft elastomeric isolators 39 and 49 are bonded in place by suitable means.

While I have illustrated and described the preferred embodiments of the invention, it is to be understood that I do not limit myself to the precise constructions herein disclosed and the right is reserved to all changes and modifications coming within the scope of the invention as defined in the appended claims.

I claim:

1. A secret signaling device adapted to be carried on the body of a human operator, and built as a generally compact rigid unitary assembly, comprising:

a base element;

a movable element disposed for displacement relative to said base element by a force exerted by such operator;

transmitting means with battery means to secretly transmit a signal;

switch means operably connected mechanically between said base and movable elements and connected to activate said transmitting means;

a series of detent means including a detent follower and being mechanically connected between said base and movable elements and associated with said switch means and adapted additionally to produce transient reaction forces felt by said operator upon engagement and disengagement to provide him with concealed information of such engagement and disengagement through his tactile sense, and return spring means connected between said base and movable elements and having a spring rate sufficient to disengage at least some of said engagements of said detent means;

at least one of said series of detent means being disposed to engage and disengage before the operation of said switch means to tactilly inform said operator of the approach of activation of said transmitting means.

2. A device as in claim 1, wherein:

said detent means includes a series of notches engageable by said follower, and further comprising:

a row of stationary contacts positioned correspondingly to said notches, and a movable contact operably connected to said follower, engagement of said follower in one of said notches causing said movable contact to engage a corresponding one of said stationary contacts.

3. A device as in claim 1, further comprising:

elastomeric mounting means for said detent means to attenuate the transmission of high-frequency components of vibration to the signalling device thereby eliminating the radiation of click-like sounds.

4. A device as in claim 1 wherein:

said base element is a portion of a body-like housing having an interior cavity, said movable element is slidable in said cavity, and each said detent means comprises a pair of detent followers each on opposite side of said movable element to balance the detent spring forces against said movable element.

5. A device as in claim 1, further comprising:

said return spring means connected between said base and movable elements having a spring rate sufficient to override all of the engagements and disengagements of said detent means.

6. A device as in claim 5, wherein:

said signaling device is connected to the ends of a closable flexible belt-like member adapted to encircle a portion of the body of said operator, said movable element being movable in telescoping displacement into said base element and thereby displaceable in response to tension in said member, the reaction forces causing transient changes in said tension which can be felt as feedback signals through such body portion, and voluntary distension of such body portion causing such displacement.

7. A device as in claim 6, wherein:

said signaling device is in the general form of a belt buckle and said belt-like member is a waist belt, said body portion being the waist, said base element having a slotted extension portion adapted to receive one end of said belt, and said movable element having a similar slotted end portion adapted to receive the other end of said belt.

8. A device as in claim 7, wherein:

said transmitting means is a miniature radio transmitter powered by a battery, and said transmitter and battery are housed inside said movable element.

9. A device as in claim 1, wherein:

said switch means comprises an electrical contact means actuated by said follower at each position of said movable element corresponding to a signal-transmitting detent position, whereby a series of closures of said contacts may be effected in a single displacement of said movable element to transmit a coded signal.

10. A device as in claim 9, further comprising:

a receiver having signal output terminals, and means operably connected to said receiver for counting signal pulses which appear at said terminals.

11. A device as in claim 10, further comprising:

alarm means operably connected to said counting means and being actuated by reception from said counting means of the coded signal.

12. A device as in claim 9, further comprising a receiver having signal output terminals, a pulse counter operably connected to said terminals for receiving such coded signal, and alarm means operably connected to said counter and being actuated by reception from said counter of such coded signal.

13. A device as in claim 12, further comprising:

decoding means associated with said receiver to distinguish pulses originating from displacement of said movable element in one direction from pulses originating from such displacement in the opposite direction, whereby the operator may exert force to displace said movable element through a desired number of detent engagements by tactile sense, and then release such force to permit said return spring means to move said movable element rapidly through such engagement to form such coded signal.

14. A device as in claim 13 wherein:

said decoding means comprises a pulse-rate discriminator means connected to prevent actuation of said alarm means unless said coded signal occupies less than a predetermined time interval.

* * * * *